United States Patent
Gasparik

(10) Patent No.: US 6,730,862 B1
(45) Date of Patent: May 4, 2004

(54) ERASE FEATURE IN PEN-BASED COMPUTING

(75) Inventor: Frank Gasparik, Monument, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/579,320

(22) Filed: Dec. 27, 1995

(51) Int. Cl.$^7$ ............................................... G08C 21/00
(52) U.S. Cl. ................... 178/18.01; 178/18.03; 178/18.07; 178/19.01; 178/19.03
(58) Field of Search ............................. 345/173, 179, 345/104, 118, 434; 382/187, 282, 309; 395/358; 178/18.01, 18.03, 18.07, 19.01, 19.03

(56) References Cited

U.S. PATENT DOCUMENTS

| | | | |
|---|---|---|---|
| 4,633,436 A | 12/1986 | Flurry | 364/900 |
| 4,670,751 A | 6/1987 | Enokido et al. | 340/706 |
| 4,675,476 A | 6/1987 | Kobayashi | 178/18 |
| 4,711,977 A * | 12/1987 | Miyamori et al. | 178/18 |
| 4,883,926 A | 11/1989 | Baldwin | 178/18 |
| 4,972,330 A * | 11/1990 | Matsushiro et al. | 345/118 |
| 5,023,408 A * | 6/1991 | Murakami et al. | 178/19 |
| RE33,936 E | 5/1992 | Miyamori et al. | 178/18 |
| 5,157,737 A * | 10/1992 | Sklarew | 345/173 |
| 5,211,564 A | 5/1993 | Martinez et al. | 434/323 |
| 5,325,110 A | 6/1994 | Tang et al. | 345/157 |
| 5,347,620 A | 9/1994 | Zinner | 395/129 |
| 5,412,775 A | 5/1995 | Maeda et al. | 395/158 |
| 5,414,228 A | 5/1995 | Yamashita | 178/18 |
| 5,438,662 A | 8/1995 | Randall | 395/161 |
| 5,513,309 A * | 4/1996 | Meier et al. | 345/179 |
| 5,570,113 A * | 10/1996 | Zetts | 345/173 |
| 5,602,570 A * | 2/1997 | Capps et al. | 178/18 |

\* cited by examiner

Primary Examiner—Vijay Shankar

(57) ABSTRACT

The present invention allows a user to draw a closed periphery around an amount of information on the display of a pen-based computer system. The periphery information is transmitted to the computer system by a digitizing tablet. When received by the computer system, the computer system divides the area enclosed by the periphery into a number of lines. The computer system then processes each of these lines and determines the information to erase on a given line.

26 Claims, 5 Drawing Sheets

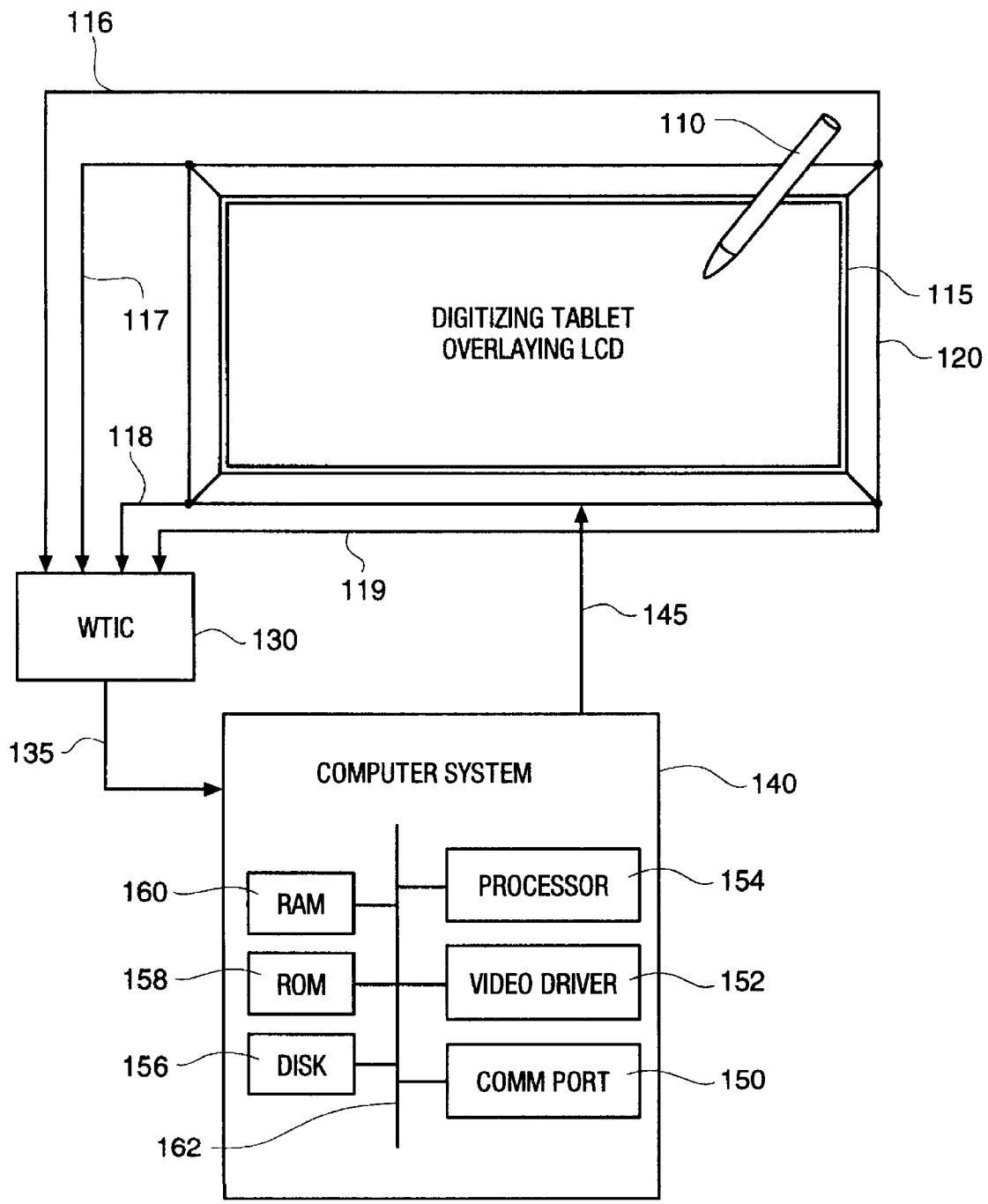
*FIG._1*

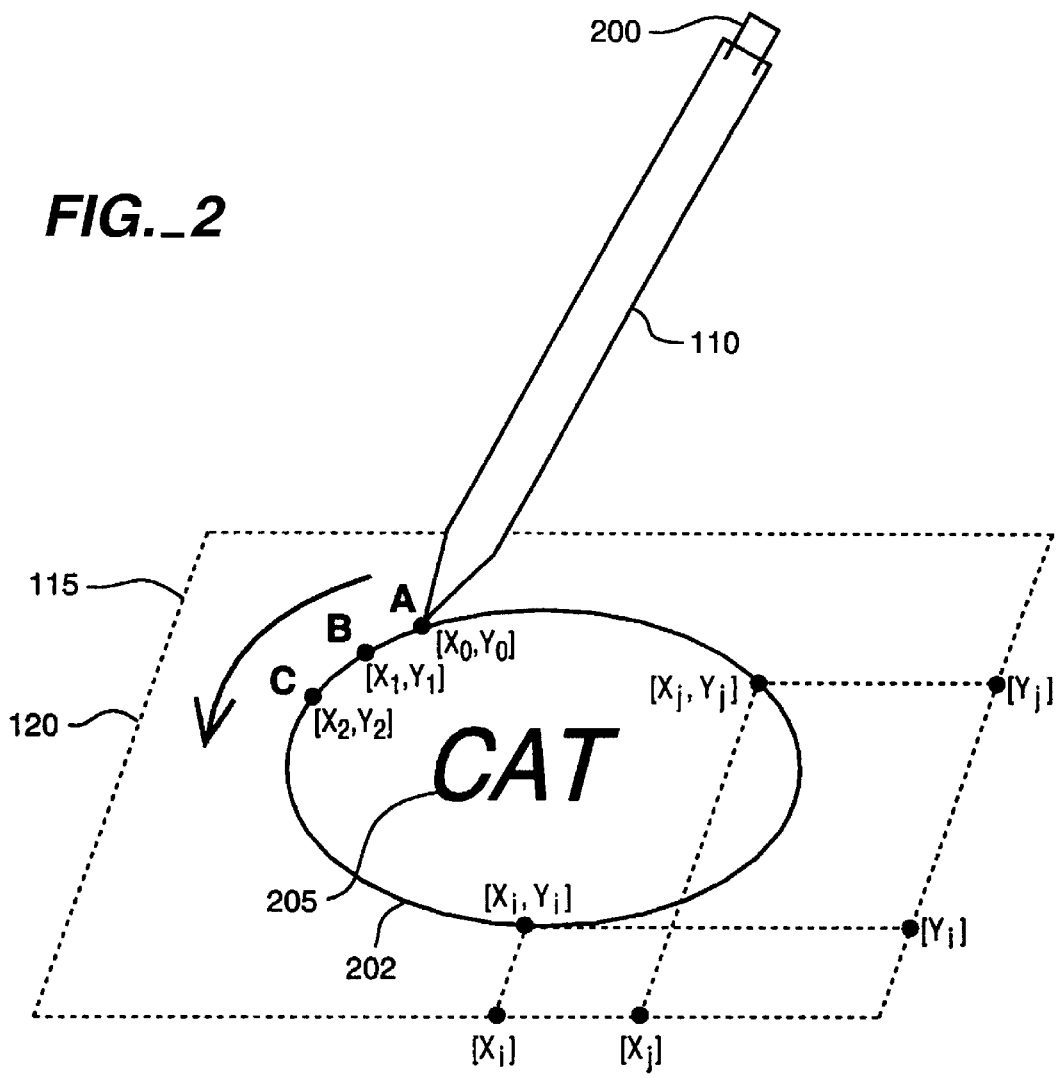
FIG._2
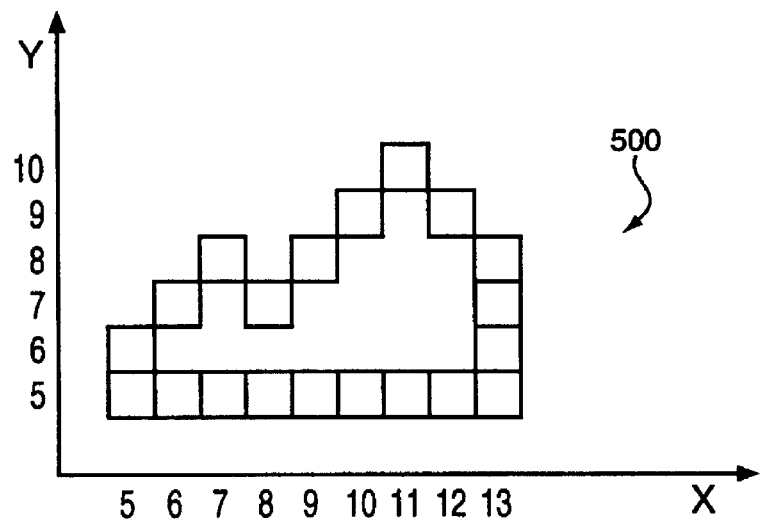
FIG._5

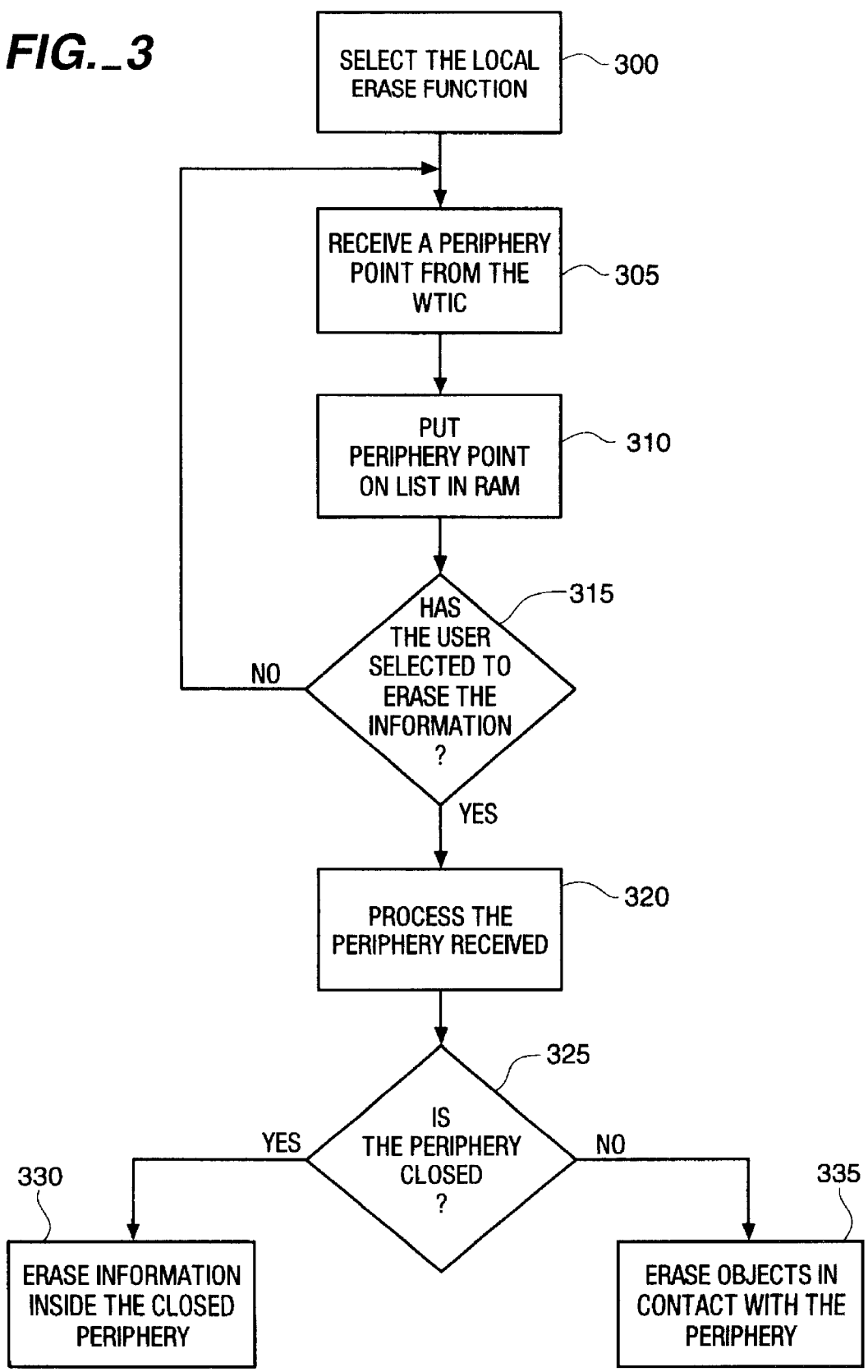

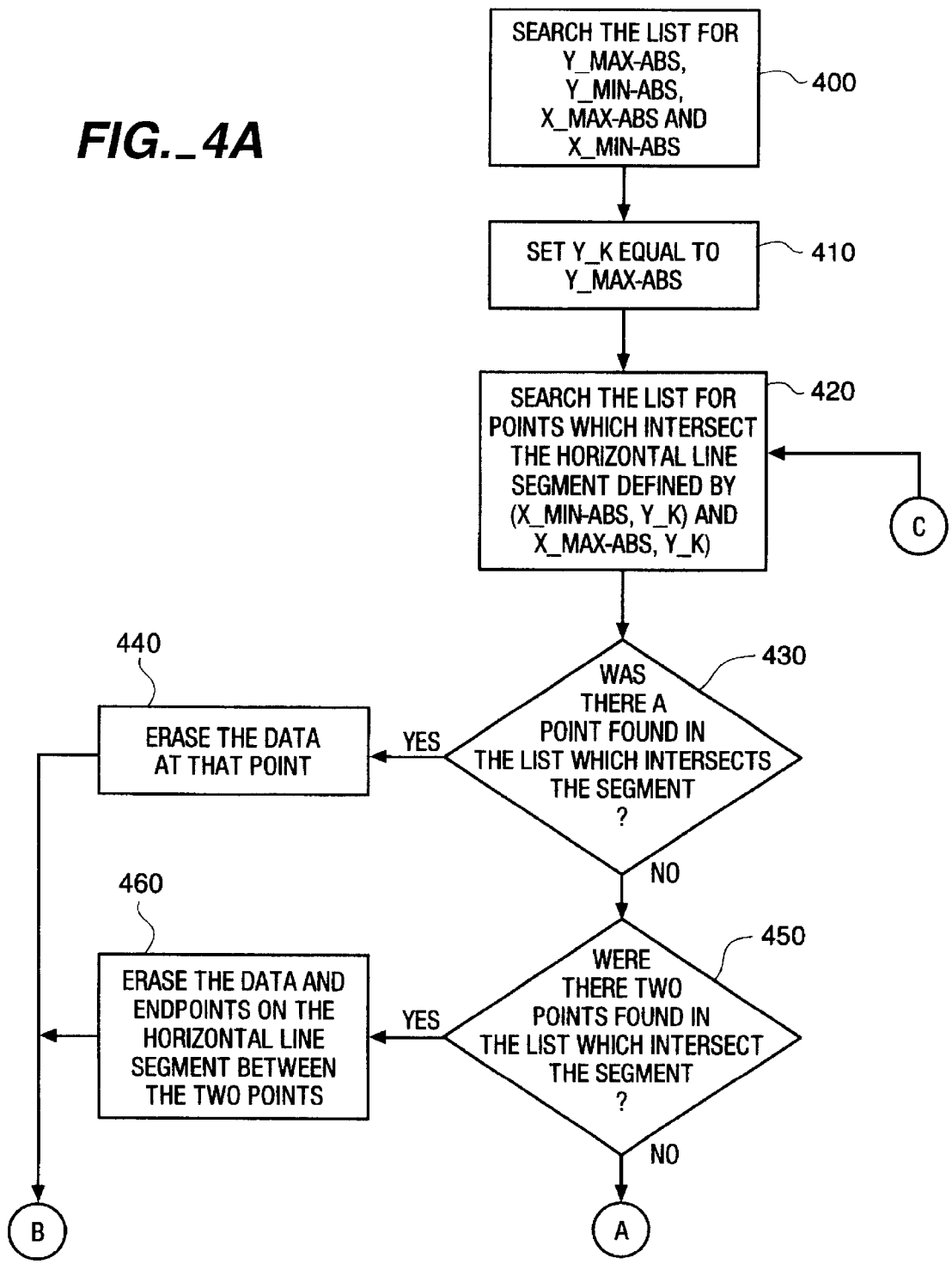
FIG._4A

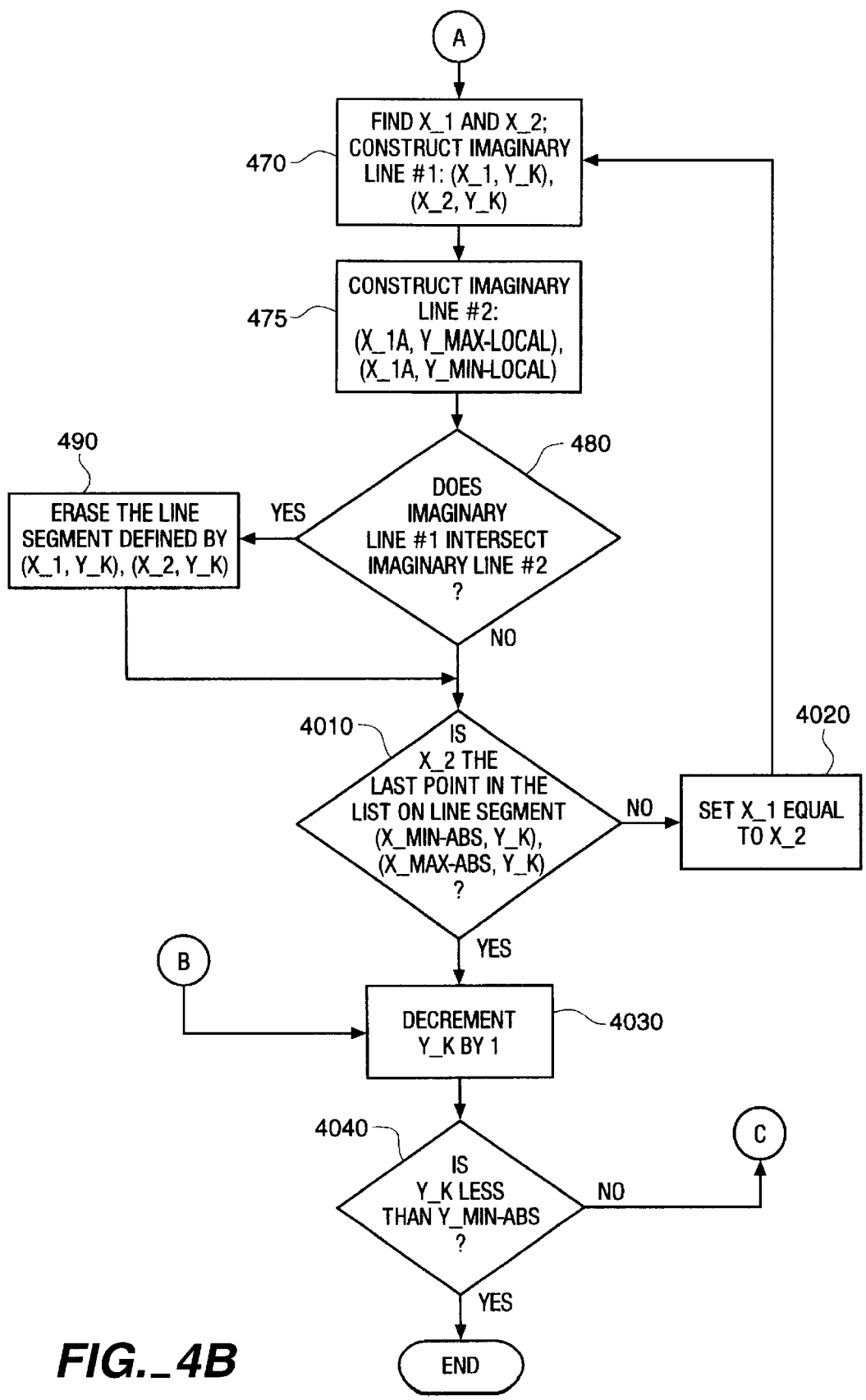
FIG._4B

ERASE FEATURE IN PEN-BASED COMPUTING

BACKGROUND OF THE INVENTION

1. Technical Field

This invention relates to pen-based computing items. Specifically, this invention relates to a method and apparatus for erasing information from the screen of a pen-based computer.

2. Description of the Related Art

As the popularity of pen-based computer systems has grown, so has the need for quick and efficient methods to manipulate images on these computers' displays. One specific type of function that can greatly enhance the functionality of a pen-based computer system is the ability to quickly and easily remove information from the display. A well-designed erase function enhances functionality by making it easy to edit and delete text and graphics from the display.

The prior art has addressed the general problem of erasing unwanted information from a computer display in a number of ways. Some prior art computer systems allow a user to select an object (e.g., an icon, a paragraph, etc.) and then command the computer system to delete that object. For example, in a word processing program, a user may be able to select an entire paragraph of text and then command the computer system to delete that text. This approach is not effective for pen-based computer systems because information is often not stored in discreet, organized sections.

Another prior art solution allows the user to convert the cursor into an electronic eraser. Information from the display can then be deleted by moving the cursor over it. However, this type of erase function does not make efficient use of the movements of the cursor, and it can be difficult to completely erase all of the information in a given area.

Yet a final prior art solution allows a user to encircle an area of information on the computer display and then mark that area for deletion. This type of erase operation is efficient from a user's standpoint, as it tends to minimize cursor movements. However, prior art implementations of this function have involved extensive data manipulation which is not possible using the more limited processing resources of a pen-based computer system.

Therefore, it would be advantageous to have a method and apparatus for allowing a user to quickly mark an area of information on a computer system to be erased. Also, such a method and apparatus would need to make efficient use of the computer's processing resources so it would be practical to implement on a pen-based computer system.

SUMMARY OF THE INVENTION

The present invention may be characterized as either a method or an apparatus. When characterized as a method, the present invention allows a user to draw a closed periphery around an amount of information on the display of a pen-based computer system. The periphery information is transmitted to the computer system by a digitizing tablet. When received by the computer system, the computer system divides the area enclosed by the periphery into a number of lines. The computer system then processes each of these lines and determines the information to erase in a given line.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 illustrates a block diagram of a pen-based computer according to the present invention.

FIG. 2 depicts a user selecting some information to be erased according to the present invention.

FIG. 3 illustrates the method by which a user can select information to be erased according to the present invention.

FIGS. 4A and 4B illustrate a more detailed view of a portion of FIG. 3 according to the present invention.

FIG. 5 depicts a periphery that can be processed by the method illustrated in FIGS. 3 and 4, according to the present invention.

DETAILED DESCRIPTION

While the invention has been particularly shown and described with reference to a preferred embodiment, it will be understood by those skilled in the art that various changes in form and detail may be made therein without departing from the spirit and scope of the invention.

With respect now to the figures, and in particular with reference to FIG. 1, a block diagram of a pen-based computer system is depicted. Digitizing tablet 115 and stylus 110 are provided so that a user may enter information into computer system 140 by "writing" on digitizing tablet 115. Information entered into digitizing tablet 115 is ultimately communicated to computer system 140. Contained within WTIC 130 are four current-to-voltage amplifiers.

These current-to-voltage amplifiers communicate the physical location of stylus 110 to the rest of the pen-based computer system. When a user "writes" on digitizing tablet 115 using stylus 110, currents are induced within digitizing tablet 115. These currents are then communicated to the four current-to-voltage amplifiers in a manner well known in the art. The magnitude of the current received at a given current-to-voltage amplifier will depend upon the location of stylus 110 on digitizing tablet 115. Thus, as stylus 110 moves from one position to another on digitizing tablet 115, the current sensed at a given current-to-voltage amplifier will change.

The currents induced within digitizing tablet 115 are communicated to write touch interface circuitry (WTIC) 130, via communication lines 116, 117, 118 and 119. WTIC 130 contains electrical devices which sense the varying signals coming from communication lines 116–119. The electrical devices contained in WTIC 130 have the ability to process the varying electrical signals coming from communication lines 116–119, and to ultimately determine the location of stylus 110 on digitizing tablet 115.

After having computed the location of stylus 110 on digitizing tablet 115, WTIC 130 communicates the location of stylus 110 to computer system 140 via communication line 135. Computer system 140 contains a number of components: RAM 160, ROM 158, disk 156, processor 154, video driver 152, communication port 150, and communications bus 162. Processor 154 is capable of executing digital computer instructions. These instructions may be stored in RAM 160, ROM 158 or on disk 156. Processor 154 and the other above-mentioned components located within computer system 140 are all attached to communications bus 162. An example of a processor suitable for use in the current invention is the Intel 8088. Being connected to communications bus 162 allows the various components within computer system 140 to communicate with one another.

Further contained within computer system 140 are video driver 152 and communications port 150. Communications port 150 allows computer system 140 to communicate with other computing devices. Communications port 150 can be implemented in several ways. For example, communications port 150 could be a network communications interface, a modem, a serial port, or a parallel port.

Video driver 152 is provided to display images on LCD display 120. These images are communicated to LCD 120 via communications line 145. LCD display 120 lies under digitizing tablet 115. Although it is located underneath digitizing tablet 115, a user's view of LCD display 120 is not obstructed.

As stated above, computer system 140 receives the location coordinates of stylus 110 on digitizing tablet 115 from WTIC 130 via communication line 135. Processor 154 is able to interpret information coming from WTIC 130 and direct video driver 152 to display images on LCD display 120. The images displayed on LCD display 120 closely follow the path of stylus 110. This mode of display gives the impression to a user operating stylus 110 that they are "drawing" on top of LCD display 120.

In a preferred embodiment of the present invention, the pen-based computer system shown in FIG. 1 is contained within a small portable housing. Being contained within a portable housing allows a user to transport the pen-based computer system with ease. This transportability enhances the functionality of the pen-based computer system described in FIG. 1.

Now with respect to FIG. 2, an illustration of how a user might utilize stylus 110 to erase an area of LCD display 120 is depicted according to the present invention. Shown in FIG. 2 are stylus 110, digitizing tablet 115, and LCD display 120. At the top of stylus 110 is switch 200. Switch 200 can be used to command a computer system, not shown in this figure, to perform a variety of functions. As noted with respect to FIG. 1, digitizing tablet 115 overlays LCD display 120, but does not obstruct a user's view of LCD display 120.

As shown in FIG. 2, a user has utilized stylus 110 to draw a periphery 202 around an area of information in the center of LCD display 120. This information is denoted by word 205. Although periphery 202 is shown as being a particular shape, the user can enclose an area of information with a periphery of any shape, as the method of processing described below can process peripheries having an arbitrary shape. The periphery around word 205 is stored in a computer system as a series of coordinates. Some of these coordinates are shown for illustrative purposes.

Now with respect to FIG. 3, a flowchart of a process for erasing information is illustrated according to the present invention. In step 300, the user initiates the local erase function. This initiation can be accomplished in a variety of ways. For example, a user can activate switch 200, which is shown in FIG. 2 on top of stylus 110. Alternatively, a user can select an icon on the LCD display. Further, a user may mark a special symbol on the LCD display using a stylus. The computer system can then recognize this special character as initiating the local erase function. For example, if a user draws on the LCD display the letter "E", the computer system may be programmed to recognize this character as initiating the local erase function.

In step 305, the computer system begins to receive periphery information from the WTIC. After initiating the local erase function in step 300, the user will begin to draw on the LCD display to indicate which information they wish to erase. As the user begins to draw, the digitizing tablet overlaying the LCD display will sense the position of the stylus and will communicate this information to the WTIC. In turn, the WTIC will communicate to the computer system the coordinates of the LCD display's pixels which have been activated due to the stylus' movements over the digitizing tablet.

In step 310, the computer system places the periphery points received in step 305 into a list structure in the computer system's RAM. By maintaining this list of points, the computer system will be able to analyze the list of points when the user communicates to the computer system that he is finished drawing on the LCD display.

In step 315, the computer system checks to see whether the user has decided to erase the information previously enclosed in steps 305 and 310. If the user has not decided to erase the information previously enclosed, the process returns to step 305 to receive more periphery information from the stylus and digitizing tablet. If the user has finished drawing on the LCD display and now wants to erase the information selected by the periphery previously drawn in steps 305 and 310, the YES branch of step 315 will be followed.

Many ways exist for the user to choose to erase the selected information. As was the case for initiating the local erase function, the user may activate an icon, operate a switch on top of the stylus, or may enter by hand a special character on the digitizing tablet. The computer system can be programmed to interpret one or more of these actions as indicating the user has chosen to erase the selected information.

In step 320, the computer system analyzes the periphery data that has been stored in RAM in the form of a list. In step 320, the computer system determines whether the periphery that has been drawn by the user forms a closed shape. The determination of whether the periphery is closed can be easily determined by "walking" through the list to determine if contiguous pixels have been activated. If contiguous pixels have been activated, the periphery is then searched to determine if a common point exists. That is, the computer system has to determine whether the periphery crosses back upon itself, thereby enclosing some amount of information. If contiguous pixels have been activated and a common point exist in the list of points, the periphery is determined to be closed.

In step 325, the results from the periphery processing in step 320 are analyzed. If the periphery entered by the user is determined to be closed, the process step then follows the YES branch of step 325 to step 330. If the periphery is not closed, the process step the NO branch of step 325 to step 335.

In step 330, the information that is enclosed by the periphery is erased. The exact method by which this information is erased will be described in more detail below in the discussion of FIGS. 4A and 4B. In step 335, information will be erased according to a different method than the one shown in step 330. Step 335 handles the case where a user has simply stricken through an area of information as opposed to enclosing it.

With reference now to FIGS. 4A and 4B, a detailed representation of step 330 found in FIG. 3 is depicted according to the present invention. FIGS. 4A and 4B illustrate in detail how information that has been enclosed in a periphery drawn by a user may be erased. FIGS. 4A and 4B assume that the user has drawn a closed periphery around an area of information that is to be erased. Also, the coordinates of the periphery are assumed to be stored in a list structure found in a computer system. in step 400, a search of the list of coordinates which defines the periphery is conducted. This search is to determine which coordinates in the list have the maximum and minimum y values. These y values are assigned the labels y_max-abs and y_min-abs, respectively, and are used to set the upper and lower limits of the area to be processed in the following steps. Also, a search is conducted to determine the maximum and minimum x values. These values become labeled x_max-abs and x_min-abs and are used as the horizontal limits in the following processing.

In step 410, y_k, which is the vertical value of the horizontal line segment to be processed, is set equal to y_max-abs. In step 420, the horizontal line segment having a value of y_k is processed. This processing is conducted along the horizontal line segment (x_min-abs, y_k), (x_max-abs, y_k). The processing conducted in step 420 is performed to determine how many different points in the list fall on this single horizontal line segment.

In step 430, if only one point was found on the horizontal line segment being searched, processing is directed to step 440. In step 440, the single point that was found on the horizontal line segment being searched is erased. Ordinarily, a single point will be found on a given horizontal line segment only when that single point represents the point in the list having the maximum or minimum y value. From step 440, processing continues at step 4030.

If more than one point was found on the horizontal line segment being searched, processing is directed to step 450.

In step 450, a test is conducted to determine if only two points intersect with the horizontal line segment being processed. If it is determined that there are only two points in the list which intersect with the horizontal line segment being processed, processing continues at step 460. In step 460, the two points located on the horizontal line segment being searched are erased, as well as all of the other points between the two points on the same horizontal line segment. From step 460, processing continues at step 4030.

If it is found that there are three or more points in the list which fall on the horizontal line segment being processed, processing shifts to step 470 from step 450.

In step 470, the first two points on the current horizontal line segment are identified. These two points may be identified as x_1 and x_2. These two points define a first imaginary line segment within the current horizontal line segment being processed. This first imaginary line segment may be defined as (x_1, y_k), (x_2, y_k). Processing then continues in step 475, with another imaginary line segment being constructed. This second imaginary line segment is perpendicular to the first imaginary line segment drawn in step 470. This second imaginary line segment is defined by points (x_1a, y_max-local) and (x_1a, y_min-local). x_1a may be any point between x_1 and x_2. Further, y_max-local and y_min-local are the maximum and minimum y values of the points in the list which have as an x value x_1a.

Both the first and second imaginary line segments are imaginary in the sense that they are not displayed to the user. These imaginary line segments are constructed to aid in the processing of the closed shape and to ensure that information within convex and concave curves is correctly erased.

In step 480, a determination is made as to whether the first imaginary line segment, constructed in step 470, intersects with the second imaginary line segment, constructed in step 475. If these two imaginary line segments intersect, processing continues in step 490. In step 490, all of the information and the end points defined by the imaginary line segment (x_1, y_k), (x_2, y_k) are erased. Returning now to step 480, if the two imaginary line segments do not intersect, processing continues at step 4010.

From step 490, processing continues in step 4010. In step 4010 a test in performed to determine if x_2 was the last point in the list found on the horizontal line segment currently being processed. This test is necessary because in step 450, it was determined that there were at least three points in the list which intersect the current horizontal line segment, and that only two of these points can be analyzed in a given pass through steps 470 through 490. Thus, the processes defined in steps 470, 475, 480, and 490 will need to be repeated at least twice for a given horizontal line segment.

If x_2 is not the last point in the list which intersects the current horizontal line segment, processing continues at step 4020. In this step, x_1 is set equal to x_2. Next, in step 470, the current horizontal line segment is searched for a new point which will be defined as the new x_2.

If x_2 was the last point in the current horizontal line segment being processed, processing continues at step 4030. Step 4030 represents the end of the processing that occurs for a given horizontal line segment. In step 4030, the processing shifts to the next horizontal line segment which is below the previous horizontal line segment, that was processed. This shift in processing is accomplished by decrementing the value y_k.

From step 4030, processing is shifted to step 4040. In this step, a test is performed to determine whether the last horizontal line segment analyzed was the last horizontal line segment which contains information to be erased. This determination is accomplished by comparing y_k to y_min-abs. If y_k is less than y_min-abs, all of the horizontal line segments which were enclosed by the periphery received in steps 305 through 315, as shown in FIG. 3, have been processed. If y_k is not less than y_min-abs, horizontal line segments are still present to be processed, and processing from step 4040 continues at step 420. Returning to step 420 again, another horizontal line segment is processed.

With reference now to FIG. 5, a closed periphery is shown that is suitable for being processed by the method as described in FIGS. 4A and 4B. The method as described in FIGS. 4A and 4B would process the closed periphery as shown in FIG. 5 in the following manner:

In step 400, closed periphery 500 is processed to determine y_max-abs, y_min-abs, x_max-abs, and x_min-abs. y_max-abs is determined to be point (11,10), and y_min-abs is determined to be the group of points having a y value of 5. x_max-abs is found to be the group of points having an x value of 13, while x_min-abs is determined to be the two points having an x value of 5.

In step 410, y_k is set equal to 10, which is the y_max-abs value. In FIGS. 4A and 4B, y_k denotes the current horizontal line segment being processed. Setting this value equal to 10 in the present example allows for processing to start at the top of closed periphery 500.

In step 420, the points in closed periphery 500 are searched to determine which ones intersect the line segment defined by points (5,10), (13,10). This line segment corresponds to the current horizontal line segment being processed. This horizontal line segment is bounded by the absolute minimum and maximum x values contained in closed periphery 500.

In step 430, a test is performed to determine if only one point was found which intersects the current horizontal line segment being processed. In this particular instance, only point (11,10) will be found to intersect the current horizontal line segment. Hence, processing continues at step 440. In step 440, the data point (11,10) is then erased.

The particular erase function performed in steps 440, 460, and 490 may be implemented in a variety of ways. In a preferred embodiment of the present invention, a pixel on an mono-color LCD display is erased by changing it from dark to light.

From step 440, processing continues at step 4030. In step 4030, the value y__k is decremented by one. In this case, the previous horizontal line segment being processed had a value of 10. The new horizontal line segment to be processed will have a y value of 9. Thus, y__k will now equal 9.

In step 4040, the new y__k value is compared to y__min-abs. This test determines if all of the horizontal line segments have been processed. In this case, y__min-abs is equal to 5, whereas the current y__k value is equal to 9. Thus, processing continues at step 420.

In step 420, the points in closed periphery 500 are again searched to determine which points intersect the horizontal line segment having a y value of 9. Processing continues at step 430, where it is determined that there is not a unique point which intersects the current horizontal line segment. From there, processing continues at step 450. Step 450 tests whether there were two points found in closed periphery 500 which intersect the current horizontal line segment. In this instance, points (10,9) and (12,9) intersect the current horizontal line segment. From step 450, processing continues at step 460. At step 460, the two points found in step 420, as well as all of the other points contained between those two points are erased.

From step 460, processing continues at step 4030. In step 4030 and 4040, the current horizontal line segment being processed is decremented and set equal to 8. Processing continues again in step 420. In step 420, the list of points which defines closed periphery 500 is again searched to determine which points intersect with the horizontal line segment (5,8), (13,8). The results of this search will determine that there are three points which intersect this given horizontal line segment. These points are points (7,8), (9,8) and (13,8). Since there are three points which intersect the current horizontal line segment, steps 430 and 450 will follow their NO branches.

Processing then continues in step 470. In step 470, the first two x values are determined. In this case, this will be points (7,8) and (9,8). Also in step 470, an imaginary line segment is constructed between these two points. As there is only a single point between x__1 and x__2, only point (8,8) will be included on this imaginary line segment. Next, in step 475, another imaginary line segment is constructed. This second imaginary line segment is defined by the points x__1a, y__max-local and y__min-local. x__1a is a point found in between x__1 and x__2. In the present case, there is only one point between x__1 and x__2. Thus, in the current example, x__1a will have a value of 8. y__max-local and y__min-local are the maximum and minimum y values of points which have an x value equal to 8. In the present example, point (8,7) is the point which has the maximum y value and has an x value equal to x__1a. Likewise, point (8,5) is the point which has the minimum y value and an x value equal to 8. Thus, in step 475, a second imaginary line segment is drawn between the point (8,7) and (8,5). In step 480, a test is performed to determine whether these two imaginary line segments intersect. In the present case, the answer is no. Hence, processing continues in step 4010.

In step 4010, it is determined whether point x__2 is the last point in closed periphery 500 which falls upon the current horizontal line segment. In the present case, the point (9,8) is only the second point out of three on the horizontal line segment having a y value of 8. Thus, x__1 is set equal to x__2 in step 4020 and processing continues at step 470.

In step 470, x__1 has already been determined to be point (9,8) and x__2 is then found to be point (13,8). Also in step 470, an imaginary line segment is drawn between x__1 and x__2. This imaginary line segment has as end points (9,8) and (13,8). Contained within this imaginary line segment are points (10,8), (11,8), and (12,8). In step 475, x__1a, y__max-local, and y__min-local are determined. In the present case, x__1a may have the value of 10, 11 or 12. For this example, x__1a will have the value of 11. Next, y__max-local and y__min-local are determined. For an x value equal to 11, y__max-local will have a value of 10 and y__min-local will have a value of 5. Thus, the second imaginary line segment will have as end points, point (11,10) and (11,5).

In step 480, it is determined whether these two imaginary line segments intersect. In the present case, they do. Processing then continues in step 490. In step 490, the line segment and endpoints, defined by (x__1, y__k), (x__2, y__k) are erased. This will erase points (9,8), (10,8), (11,8), (12,8), and (13,8) inside of closed periphery 500.

Next, processing will continue in step 4010. Step 4010 will determine whether x__2 is the last point in the list which intersects the current horizontal line segment. In the present case, x__2 is the last point in the list on the line segment having a y value of 8. Hence, processing continues at step 4030.

In step 4030 and 4040, processing continues on the horizontal line segment having a y value of 7.

The horizontal line segment having a y value of 7 gets processed in much the same manner as the horizontal line segment having a y value of 8. Likewise, the horizontal line segment having a y value of 6 gets processed in much the same manner as the horizontal line segment having a y value of 9. Finally, the horizontal line segment having a y value of 5 gets processed in much the same way as the horizontal line segment having a y value of 10. The exception with the horizontal line segment having a y value of 5 being that there are several consecutive points on that horizontal line segment. In such a case, the consecutive points are treated as being a single point for the purposes of the processing method described in FIGS. 4A and 4B.

The processes depicted in FIGS. 3–5 may be implemented by those of ordinary skill in the art within the data processing system depicted in FIG. 1. The processes of the present invention also may be implemented in a program storage device that is readable by a data processing system, wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method for erasing information on a display of a pen-based computer system containing a digitizing tablet, a processor, a memory device, and a display, comprising:

receiving input defining a closed periphery around an object on the display, wherein the closed periphery defines an area;

dividing the area defined by the closed periphery into a plurality of lines;

processing each of the plurality of lines to identify information associated with the object; and erasing the identified information in response to the processing step, wherein the object within the closed periphery is removed from the display.

2. The method as recited in claim 1 wherein the input defining the closed periphery comprises a plurality of data points; and further comprising, communicating the data points to the processor by the digitizing tablet; and storing the data points in a list in the memory device.

3. The method as recited in claim 2 wherein the dividing step further comprises dividing the area defined by the closed periphery into a plurality of horizontal line segments, which are parallel to one another.

4. A method for erasing information on a display of a pen-based computer system containing a digitizing tablet, a processor, a memory device, and a display, comprising:

receiving input defining a closed periphery around the information on the display, wherein the input defining the closed periphery comprises a plurality of data points;

communicating the data points to the processor by the digitizing tablet;

storing the data points in a list in the memory device;

dividing the area defined by the closed periphery into a plurality of lines, wherein the dividing step further comprises dividing the area defined by the closed periphery into a plurality of horizontal line segments, which are parallel to one another;

processing each of the plurality of lines, wherein the processing step further comprises:
      analyzing the list in the memory device; and
      determining how many data points are on a selected horizontal line segment; and erasing the information on at least a portion of some of the plurality of lines in response to the processing step, wherein the erasing step further comprises:
      in response to a determination that one of the data points is on the selected horizontal line segment, erasing the data point;
      in response to a determination that two of the data points are on the selected horizontal line segment, erasing the two data points and all other data points which are:
         between the two data points, and on the selected horizontal line segment; and
      in response to a determination that more than two of the data points are on the selected horizontal line segment, erasing corresponding data points and all the other data points, which are:
         between the corresponding data points, and
         on the selected horizontal line segment; and
      in response to a determination that more than two of the data points are on the selected horizontal line segment, erasing corresponding data points and all the other data points, which are:
         between the corresponding data points,
         on the selected horizontal line segment, and
         within the area defined by the closed periphery.

5. The method as recited in claim 4 wherein the corresponding data points are determined to be within the area defined by the closed periphery if a first line segment defined by the corresponding points intersects with a second line segment defined by a third point on the horizontal line segment between the corresponding points and two other points in the list with the same horizontal location as the third point.

6. The method as recited in claim 1 wherein the list of data points includes for each point and x value and a y value, the x value denoting the horizontal location of a selected data point, and the y value denoting the vertical location of the selected data point.

7. The method as recited in claim 1 further comprising activating a switch at the top of a stylus to initiate the method of erasing information on the display of a pen-based computer system.

8. An apparatus for erasing display information on the display of a pen-based computer system comprising:

a digitizing tablet for receiving periphery information from a stylus moving on the digitizing tablet;

a processor coupled to the digitizing tablet, the processor receiving and processing the periphery information from the digitizing tablet;

a memory device coupled to the processor, the memory device storing the periphery information; and a display coupled to the processor, the display depicting the movements of a stylus and other display information;

the pen-based computer system being operable in a erase mode of operation wherein:
      the digitizing tablet receives the periphery information from movements of a stylus on the digitizing tablet, the movements of a stylus define a periphery which encloses an area on the display containing the display information for an object;
      the processor receives the periphery information generated from the digitizing tablet;
      the processor stores the periphery information in the memory device;
      the processor processes the information; and
      the processor erases the display information enclosed by the periphery by dividing the area into the plurality of lines, processing each of the plurality of lines to identify information associated with the object, and erasing the identified information such that the object is erased.

9. The apparatus as recited in claim 8 wherein:

the information the processor receives from the movements of a stylus is comprised of a plurality of data points; and the processor stores the data points in a list in the memory device.

10. The apparatus as recited in claim 8 wherein the erase mode of operation further includes the processor dividing the area defined by the closed periphery into a plurality of horizontal line segments, which are parallel to one another, before processing the periphery information.

11. An apparatus for erasing display information on the display of a pen-based computer system comprising:

digitizing tablet for receiving periphery information from a stylus moving on the digitizing tablet;

a processor coupled to the digitizing tablet, the processor receiving and processing the periphery information from the digitizing tablet;

a memory device coupled to the processor, the memory device storing the periphery information; and a display coupled to the processor, the display depicting the movements of a stylus and other display information;

the pen-based computer system being operable in a erase mode of operation wherein:

the digitizing tablet receives the periphery information from movements of a stylus on the digitizing tablet, the movements of a stylus define a periphery which encloses an area on the display containing the display information;

the processor receives the periphery information comprised of a plurality of data points generated from the digitizing tablet;

the processor stores the periphery information in a list in the memory device;

the processor divides the area defined by the closed periphery into a plurality of horizontal line segments, which are parallel to one another;

the processor processes the information by:
analyzing the list in the memory device; and
determining how many data points are on a selected horizontal line segment;

the processor erases the display information enclosed by the periphery by:
if one data point is found on the selected horizontal line segment, erasing the data point;
if two data points are found on the selected horizontal line segment, erasing the two data points and all other the data points which are:
between the two data points, and
are on the selected horizontal line segment; and
if more than two data points are found the selected horizontal line segment, erasing corresponding data points, and all the other data points which are:
between the corresponding data points,
are on the selected horizontal line segment, and
are within the area defined by the closed periphery; and the processor communicates the erased display information to the display.

12. The apparatus as recited in claim 11 wherein the processor determines that corresponding data points are within the area defined by the closed periphery by determining if a first line segment defined by the corresponding points intersects with a second line segment defined by a third point on the horizontal line segment between the corresponding points and two other points in the list with the same horizontal location as the third point.

13. A program storage device containing instructions readable by a pen-based computer system comprising:

a receiving means for receiving input defining a closed periphery around an object on a display, wherein the closed periphery defines an area;

a dividing means for dividing the area defined by the closed periphery into a plurality of lines;

a processing means for processing each of the plurality of lines to identify information associated with the object; and an erasing means for erasing the information identified by the processing means, wherein the object within the closed periphery is removed from the display.

14. The program storage device as recited in claim 13 wherein the input defining the closed periphery comprises a plurality of data points.

15. The program storage device as recited in claim 14 wherein the dividing means further comprises a second dividing means for dividing the area defined by the closed periphery into a plurality of horizontal line segments which are parallel to one another.

16. A program storage device containing instructions readable by a pen-based computer system comprising:

a receiving means for receiving input defining a closed periphery around information on a display to be erased, wherein the input comprises a plurality of data points;

a dividing means for dividing the area defined by the closed periphery into a plurality of horizontal line segments which are parallel to one another;

a processing means for processing each of the plurality of lines, wherein the processing means further comprises:
an analyzing means for analyzing the list in the memory device; and
a determining means for determining how many data points are on a selected horizontal line segment; and an erasing means for erasing the information on at least a portion of some of the plurality of lines in response to the processing step, wherein the erasing means further comprises:
a single point erasing means for erasing one of the data points on the selected horizontal line segment in response to a determination that one data points is on the selected line;
a double point erasing means for erasing two data points and all other data points which are:
between the two data points, and
are on the selected horizontal line segment,
in response to a determination that two data points are on the selected horizontal line segment, and
a multi-point erasing means for erasing corresponding data points, and all other data points which are:
between the corresponding data points,
are on the selected horizontal line segment, and
are within the area defined by the closed periphery,
in response to a determination that more than two of the data points are on the selected horizontal line segment, wherein the receiving, dividing, processing, and erasing means may be selectively activated when the program storage device is connected to the pen-based computer system to effect efficient removal of the information from the display.

17. The program storage device as recited in claim 16 wherein the corresponding data points are determined to be within the area defined by the closed periphery if a first line segment defined by the corresponding points intersects with a second line segment defined by a third point on the horizontal line segment between the corresponding points and two other points in the list with the same horizontal location as the third point.

18. The program storage device as recited in claim 15 wherein the list of data points includes for each point and x value and a y value, the x value denoting the horizontal location of a selected data point, and the y value denoting the vertical location of the selected data point.

19. The program storage device as recited in claim 15 further comprising an activation means for activating a switch at the top of a stylus to initiate the process of erasing information on the display of a pen-based computer system.

20. A pen-based computer system containing a digitizing tablet, a processor, a memory device, and a display, comprising:
   an input receiving means for receiving input defining a closed periphery around an object on the display, wherein the object within the closed periphery defines an area;
   a dividing means for dividing the area defined by the closed periphery into a plurality of lines;
   a processing means for processing each of the plurality of lines to identify information associated with the object; and
   an erasing means for erasing the identified information identified by the processing means, wherein the object within the closed periphery is removed from the display.

21. The pen-based computer system as recited in claim 20 wherein the input defining the closed periphery comprises a plurality of data points; and further comprising,
   a communication means for communicating the data points to the processor by the digitizing tablet; and
   a storing means for storing the data points in a list in the memory device.

22. The pen-based computer system as recited in claim 21 wherein the dividing means further comprises a second dividing means for dividing the area defined by the closed periphery into a plurality of horizontal line segments, which are parallel to one another.

23. A pen-based computer system containing a digitizing tablet, a processor, a memory device, and a display, comprising:
   an input receiving means for receiving input defining a closed periphery around information on the display, wherein the input comprises a plurality of data points;
   a communication means for communicating the data points to the processor by the digitizing tablet;
   a storing means for storing the data points in a list in the memory device;
   a dividing means for dividing the area defined by the closed periphery into a plurality of horizontal line segments which are parallel to one another;
   a processing means for processing each of the plurality of lines, wherein the processing means further comprises:
      an analyzing, means for analyzing the list in the memory device; and
      a determination means for determining how many data points are on a selected horizontal line segment; and
   an erasing means for erasing the information on at least a portion of some of the plurality of lines in response to the processing step, wherein the erasing means further comprises:
      a single point erasing means for erasing one of the data points on the selected horizontal line segment in response to a determination that one data points is on the selected line;
      a double point erasing means for erasing two data points and all other data points which are:
         between the two data points, and
         are on the selected horizontal line segment,
      in response to a determination that two data points are on the selected horizontal line segment, and
      a multi-point erasing means for erasing corresponding data points, and all other data points which are:
         between the corresponding data points,
         are on the selected horizontal line segment, and
         are within the area defined by the closed periphery,
      in response to a determination that more than two of the data points are on the selected horizontal line segment,
   wherein efficient removal of the information from the display ma be effected.

24. The pen-based computer system as recited in claim 23 wherein the corresponding data points are determined to be within the area defined by the closed periphery if a first line segment defined by the corresponding points intersects with a second line segment defined by a third point on the horizontal line segment between the corresponding points and two other points in the list with the same horizontal location as the third point.

25. The pen-based computer system as recited in claim 20 wherein the list of data points includes for each point and x value and a y value, the x value denoting the horizontal location of a selected data point, and the y value denoting the vertical location of the selected data point.

26. The pen-based computer system as recited in claim 20 further comprising an activation means for activating a switch at the top of a stylus to initiate the method of erasing information on the display of a pen-based computer system.

* * * * *